United States Patent

Meine

(10) Patent No.: US 9,455,662 B2
(45) Date of Patent: Sep. 27, 2016

(54) ASSEMBLY FOR LOCKING AND GROUNDING SOLAR PANEL MODULES TO MOUNTING COMPONENTS

(71) Applicant: IronRidge, Inc., Hayward, CA (US)

(72) Inventor: Shawn Meine, Phoenix, AZ (US)

(73) Assignee: Ironridge, Inc., Hayward, CA (US)

( * ) Notice: Subject to any disclaimer, the term of this patent is extended or adjusted under 35 U.S.C. 154(b) by 0 days.

(21) Appl. No.: 15/007,898

(22) Filed: Jan. 27, 2016

(65) Prior Publication Data

US 2016/0218660 A1    Jul. 28, 2016

Related U.S. Application Data

(60) Provisional application No. 62/108,091, filed on Jan. 27, 2015.

(51) Int. Cl.
*H02S 20/23*    (2014.01)
*H01R 4/26*    (2006.01)

(52) U.S. Cl.
CPC ............... *H02S 20/23* (2014.12); *H01R 4/26* (2013.01)

(58) Field of Classification Search
CPC ..... H02S 20/23; H02S 40/36; H01L 31/042; H01R 4/26; H01R 4/66; F24J 2/5232
See application file for complete search history.

(56) References Cited

U.S. PATENT DOCUMENTS

| | | | |
|---|---|---|---|
| 8,025,508 B2 * | 9/2011 | Parker | H01R 4/36 439/92 |
| 8,464,478 B2 | 6/2013 | Tweedie | |
| 8,756,881 B2 | 6/2014 | West et al. | |
| 8,763,978 B2 | 7/2014 | Newman et al. | |
| 8,806,813 B2 * | 8/2014 | Plaisted | F24J 2/5207 136/244 |
| 8,826,606 B2 | 9/2014 | Yen | |
| 8,919,052 B2 * | 12/2014 | West | F24J 2/5211 52/173.3 |
| 8,919,053 B2 * | 12/2014 | West | F24J 2/5211 52/173.3 |
| 8,991,114 B2 * | 3/2015 | West | F24J 2/5211 52/173.3 |
| 9,035,176 B2 * | 5/2015 | Keller | H01R 4/64 136/244 |
| 9,080,792 B2 * | 7/2015 | Patton | F24J 2/5245 |
| 9,166,524 B2 * | 10/2015 | West | F24J 2/5205 |
| 2009/0230265 A1 | 9/2009 | Newman et al. | |
| 2011/0100433 A1 * | 5/2011 | Jonczyk | F24J 2/5232 136/251 |
| 2012/0152326 A1 | 6/2012 | West et al. | |
| 2012/0266946 A1 | 10/2012 | West et al. | |
| 2013/0140416 A1 * | 6/2013 | West | H01L 31/0422 248/222.11 |

(Continued)

FOREIGN PATENT DOCUMENTS

CN    102332481 A  *  1/2012
DE    202009016197       3/2010

(Continued)

OTHER PUBLICATIONS 6 page English translation from Google of CN 102332481.*

(Continued)

*Primary Examiner* — Robert Canfield
(74) *Attorney, Agent, or Firm* — Lance C. Venable

(57) ABSTRACT

In various representative aspects, an assembly for securing array skirts and solar panel modules in an array on a roof by utilizing rotatable locking mechanisms that both secure the solar panel modules to mounting plates and splices as well as providing a grounding path between the solar panel modules and the entire array. A method of installation of the assembly is also provided.

23 Claims, 14 Drawing Sheets

(56) References Cited

U.S. PATENT DOCUMENTS

| | | | |
|---|---|---|---|
| 2014/0175244 A1* | 6/2014 | West | F24J 2/5205 248/316.7 |
| 2014/0263899 A1* | 9/2014 | Harris | F24J 2/5245 248/220.21 |
| 2014/0338273 A1 | 11/2014 | Stapleton | |
| 2014/0338729 A1 | 11/2014 | Newman et al. | |
| 2015/0034355 A1* | 2/2015 | Patton | F24J 2/5245 174/78 |
| 2015/0144373 A1* | 5/2015 | Huang | H01L 31/05 174/78 |
| 2015/0155820 A1* | 6/2015 | West | F24J 2/5211 52/747.1 |
| 2016/0043690 A1* | 2/2016 | West | F24J 2/5211 136/244 |
| 2016/0111835 A1* | 4/2016 | Nayar | H01R 25/142 439/122 |

FOREIGN PATENT DOCUMENTS

| | | |
|---|---|---|
| DE | 10 2011 100 484 A1 * | 11/2012 |
| WO | 12079060 | 6/2012 |
| WO | 13022277 | 2/2013 |

OTHER PUBLICATIONS 18 page English translation from Google of DE 102011100484 A1.*

* cited by examiner

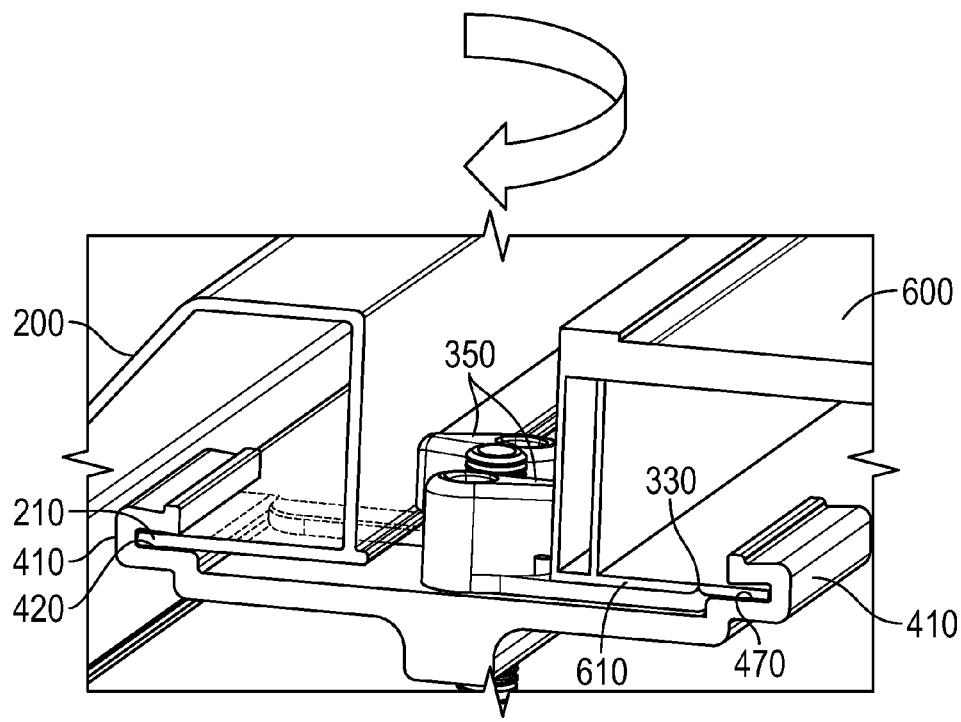
FIG. 21
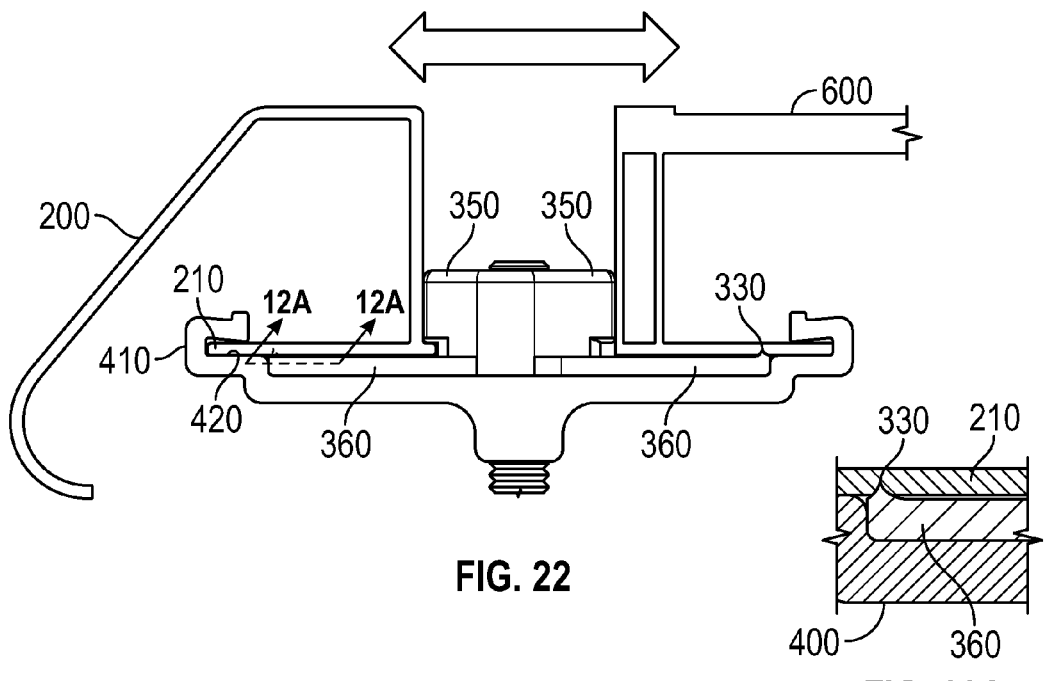
FIG. 22
FIG. 22A

ASSEMBLY FOR LOCKING AND GROUNDING SOLAR PANEL MODULES TO MOUNTING COMPONENTS

BACKGROUND OF INVENTION

1. Field of the Invention

The present invention relates generally to components used to install arrays of solar panels on residential roofs. More specifically, this invention relates to the use of a locking mechanism for securing and grounding an array of solar panels modules during the installation process in a rail-less guide system, such as a cam lock that fixes solar panels to a mounting element.

2. Description of the Related Art

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. Many of the assembly components require special tools or are generally difficult to install because they are utilized after the solar panels modules are arranged or positioned on their support elements. This is particularly true when the support elements are discrete components in a rail-less configuration. An installer must subsequently secure each solar panel module to the support element and this is often difficult to do using by hand if additional tools are required. Additionally, the solar panel modules should be electrically grounded to the support elements so the entire array is electrically connected. It is desirable to provide a simple component structure in a rail-less solar panel array configuration that allows an installer to easily arrange and lock the solar panel modules to their support elements, while electrically grounding the modules to those same elements in the array and without using additional or complicated tools.

In a typical rail-less guide system, a series of solar panel modules are inserted into a mount along the outer edges of the panels. In the present invention, each individual mount includes rotatable cam locks with grounding features that are used to secure the solar panel modules to the mounts by rotating the locks into a position that is generally perpendicular to the edges of the modules. As the lock is rotated into the locking position, it laterally thrusts the edge of the module into a lip along the outer edge of the mount thereby securing the module and preventing it from moving laterally along the mount. Additionally, as the lock is thrust into the locking position a raised portion on the lock penetrates an oxidation layer on the module, which allows the module to be electrically grounded to the mount. Each mount is secured to a series of flashings that are arranged in an array on a typical residential roof. One exemplary application of the assembly and installation method is described below.

Existing solutions are either unsatisfying in providing a way to secure solar panel arrays to rail-less guides or are too complicated to manufacture or install. Ideally, a system that allows installers to quickly and effectively secure solar panels to the mounts with minimal effort is desirable. For example, WIPO patent WO2013/022277 teaches a solar panel module array that includes a mechanism that secures a module to a supporting portion of the frame on the outside of the solar module that is arranged to rotatably pivot between the solar modules to secure the solar panels in the array. But this system is not utilized in combination with a rail-less system with rotatable cam locks that secure the solar panels on the mounts in combination with a grounding element for electrically grounding the solar panel module to the mount. This system also requires the need for separate tools to rotate the locking mechanism and is a far more complex assembly than the present invention. The present invention overcomes these limitations and provides a solution that is both easy to, install, use, and manufacture.

SUMMARY OF THE INVENTION

The invention is summarized below only for purposes of introducing embodiments of the invention. The ultimate scope of the invention is to be limited only to the claims that follow the specification.

It is an object of this invention to provide an assembly for installing an array of solar panel modules on a residential roof.

It is a further object of this invention that the assembly use individual support mounts for the solar panel modules instead of an elongated rail.

It is a further object of this invention that the assembly includes a type of individual support mount that is pivotable when secured to a flashing.

It is a further object of this invention that the assembly includes a type of individual support mount that is a splice for joining at least two solar panel modules together.

It is a further object of this invention that the support mounts include at least one locking mechanism that is a cam lock.

It is a further object of this invention that the cam lock includes a raised portion for penetrating an oxidation layer of a solar panel module to effectuate grounding the solar panel module to the support mount.

It is a further object of this invention that the cam lock is rotatable.

It is a further object of this invention that the cam lock, when rotated from an open to a locked position, secures a solar panel module to the support mount while the raised portion of the cam lock penetrates an oxidation layer of the solar panel module.

It is a further object of this invention to provide a method of assembling a solar panel array utilizing the components described below.

A person with ordinary skill in the relevant art would know that any shape or size of the elements described below may be adopted as long as the assembly can be used to secure solar panel modules to the mounting elements and provide a grounding path from the modules to the mounting elements. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 21 illustrates a perspective view of the assembly shown in FIG. 20 showing the cam locks being moved to a locked position.

FIG. 22 illustrates a side view of the assembly shown in FIG. 20 showing the cam locks being moved to a locked position and indicating lateral motion of the array skirt and solar panel module.

FIG. 22a illustrates a cross-sectional view of the raised portion shown penetrating a surface of the solar panel module.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
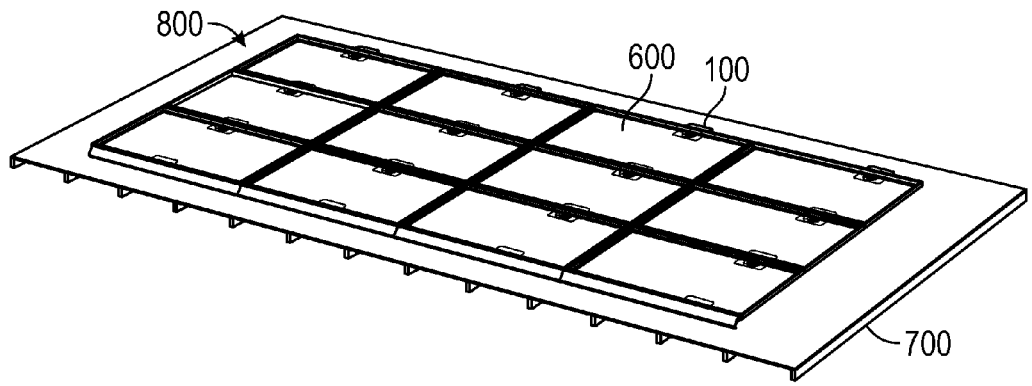
FIG. 1 illustrates a perspective view of a fully assembled solar panel array on a roof.
Figure 2:
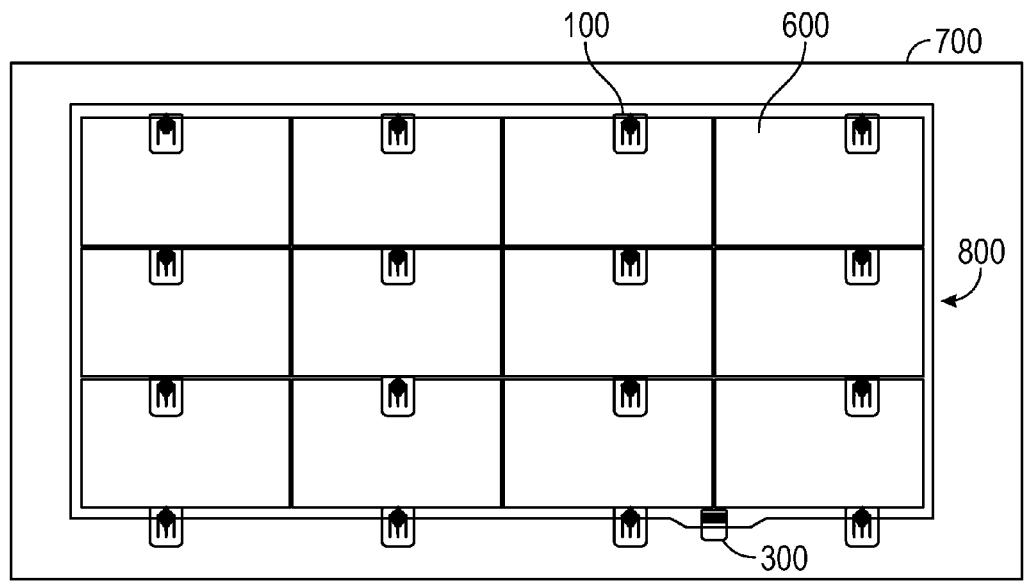
FIG. 2 illustrates a transparent top view of the same view shown in FIG. 1.
Figure 3:
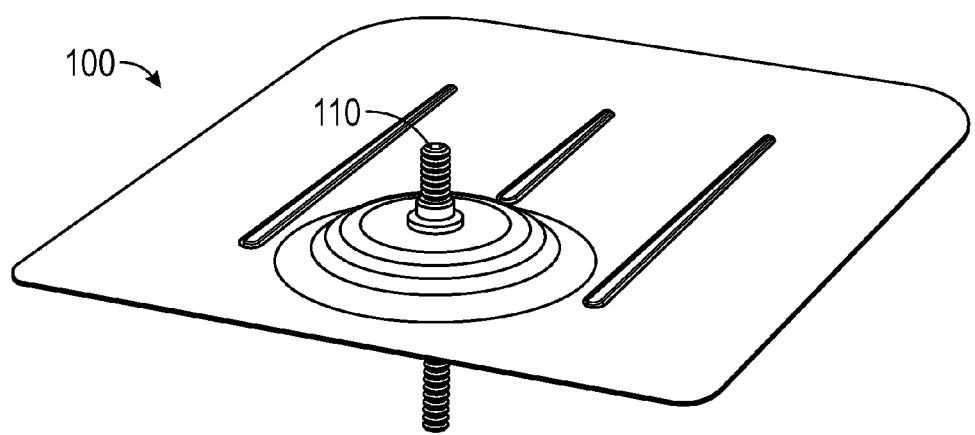
FIG. 3 shows a perspective view of a flashing apparatus.
Figure 4:
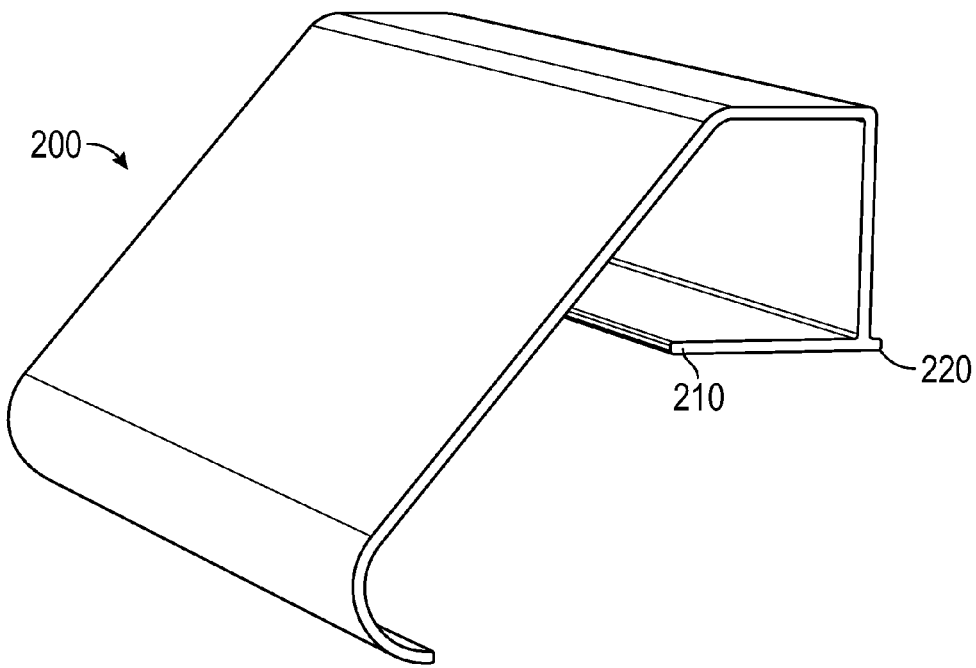
FIG. 4 illustrates a perspective view of an array skirt.

FIGS. 1 and 2 show a perspective and top view of a completed assembly of an exemplary solar panel array 800 as installed on a roof 700, and includes solar panel modules 600, array skirts 200, and flashings 100 that support several mounting plates that will be described later. FIG. 3 shows an exemplary flashing 100 that includes a securing bolt 110, but it can be of any suitable shape as long as it is capable of providing structural support to the array 800. A typical array skirt 200 is shown in FIG. 4. A typical array skirt 200 includes an extension plate 210 and a rear back 220. In the array, the array skirts 200 are typically located on the perimeter of the array, while rows of modules 600 can be installed back-to-back on a given roof. A typical solar panel module 600 has four sides and the exemplary module 600 also includes an extension plate 610 that is typically perpendicular to at least one of the sides.

Figure 5:
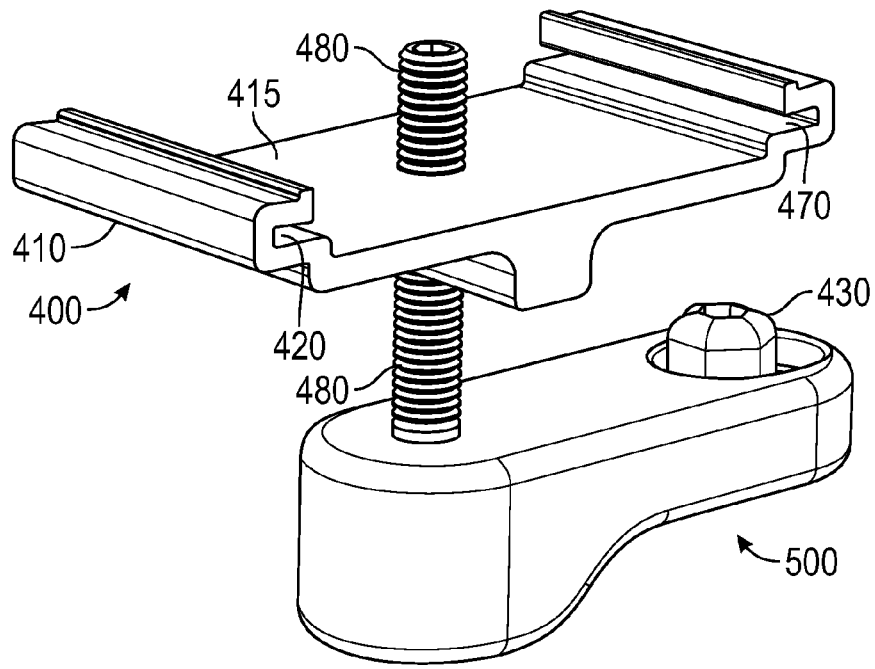
FIG. 5 illustrates the same mounting plate and pivot mount shown in FIG. 7 without the cam locks.
Figure 6:
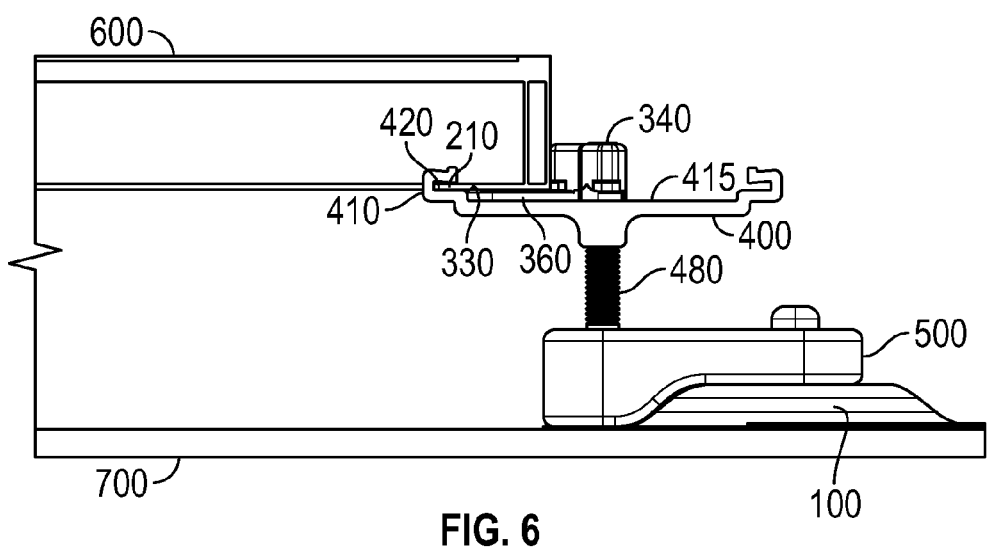
FIG. 6 illustrates a side view of the opposite side of the solar panel module array in FIG. 19 showing the solar panel module and cam lock in the locked position in the mounting plate.

The assembly comprises several primary components. FIG. 5 shows an exemplary mounting plate 400. The mounting plate 400 can support both a solar panel module 600 and an array skirt 200. In the first row of the array as shown in FIG. 1, an array skirt 200 is typically installed on a first side and a module 600 is installed on a second side opposite the first side of the mounting plate 400. In subsequent rows, modules 600 are installed back-to-back in the mounting plate 400. The mounting plate 400 includes a base area 415 and a pair of lips 410 with inlets 420 and 470 on the first and second sides respectively for receiving the bottom extension plates 610 of the modules 600 and array skirts 200. The shape of a lip 410 is typically a j-shape with the inlets 420 or 470 consisting of the opening of hook on the j-shape so that an extension plate 610 can snuggly fit within the inlets 420 or 470. A typical mounting plate 400 is supported by a pivot base 500 that includes a threaded bolt 480. The pivot base 500 can be of varying shape and is typically pivotally connected to the flashing 100. The height of the mounting plate 400 can be adjusted by rotating it around the bolt 480. The pivot base 500 is secured to a flashing 100 as shown in FIG. 6 and can also be fully rotated.

Figure 7:
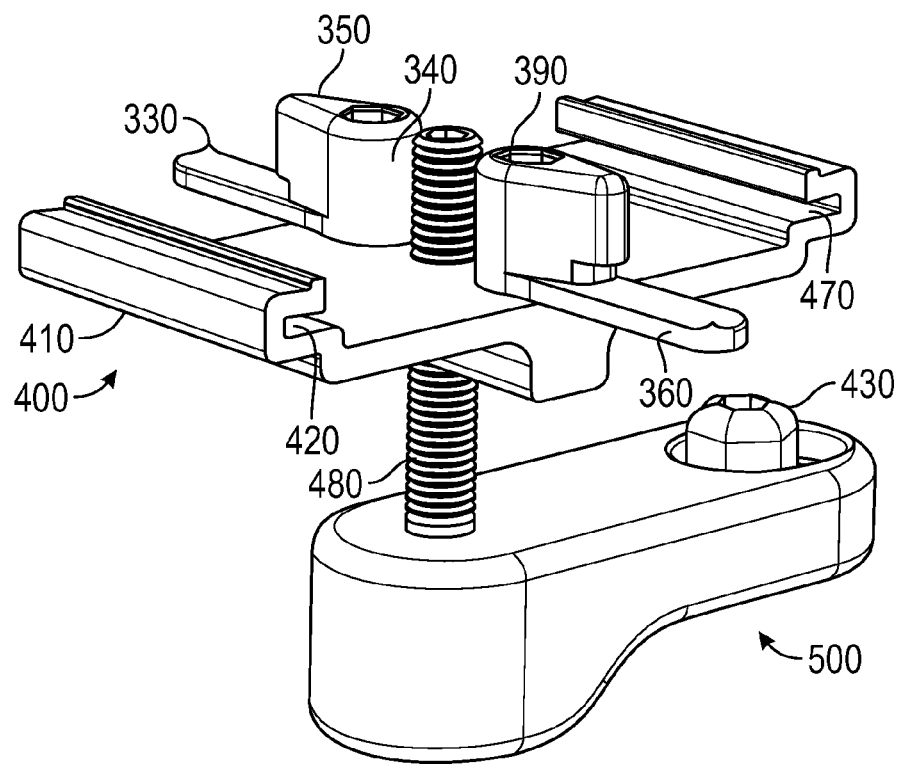
FIG. 7 illustrates a perspective view of an exemplary mounting plate and pivot mount assembly with cam locks.
Figure 8:
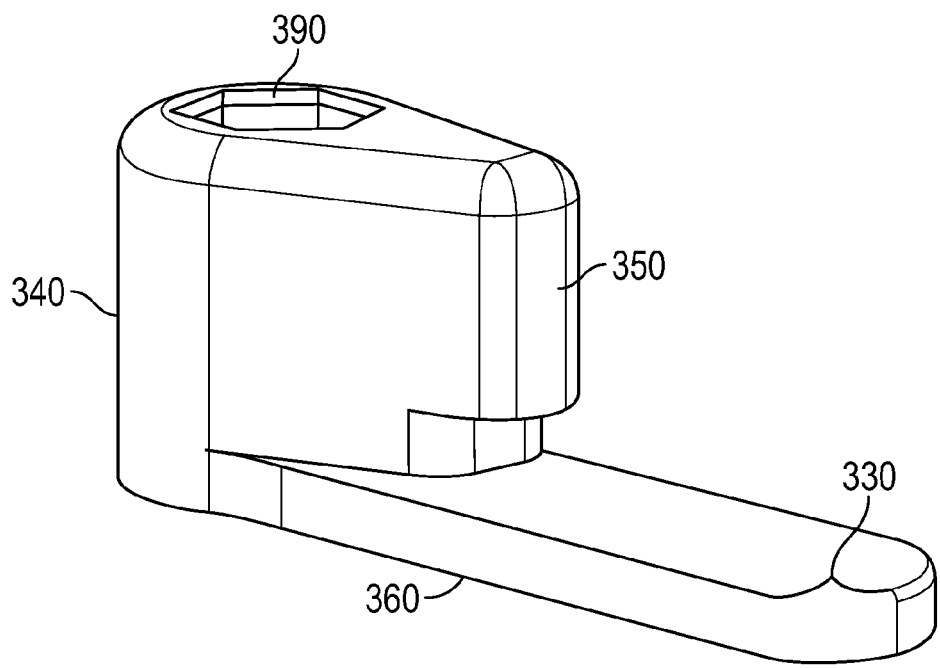
FIG. 8 illustrates a perspective view of an exemplary embodiment of a cam lock.
Figure 9:
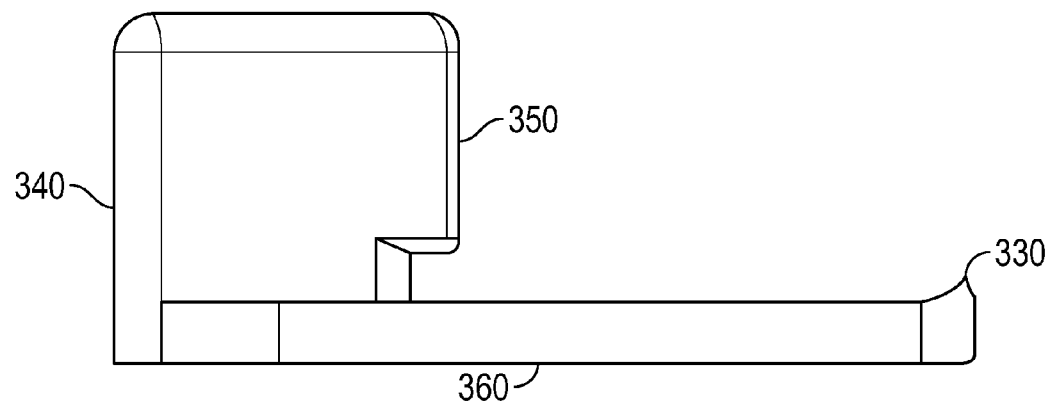
FIG. 9 illustrates a side view the cam lock shown in FIG. 8.
Figure 10:
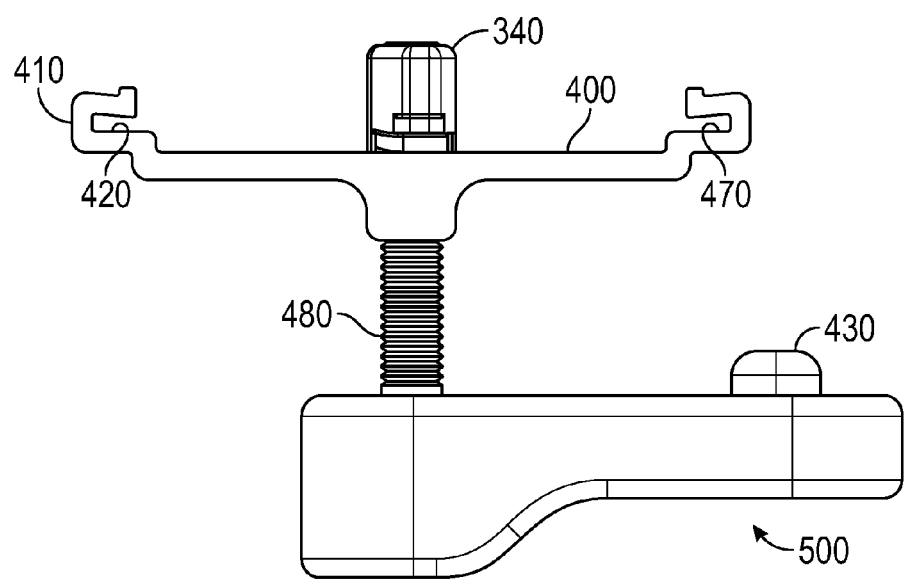
FIG. 10 illustrates a side view of the assembly shown in FIG. 7.
Figure 11:
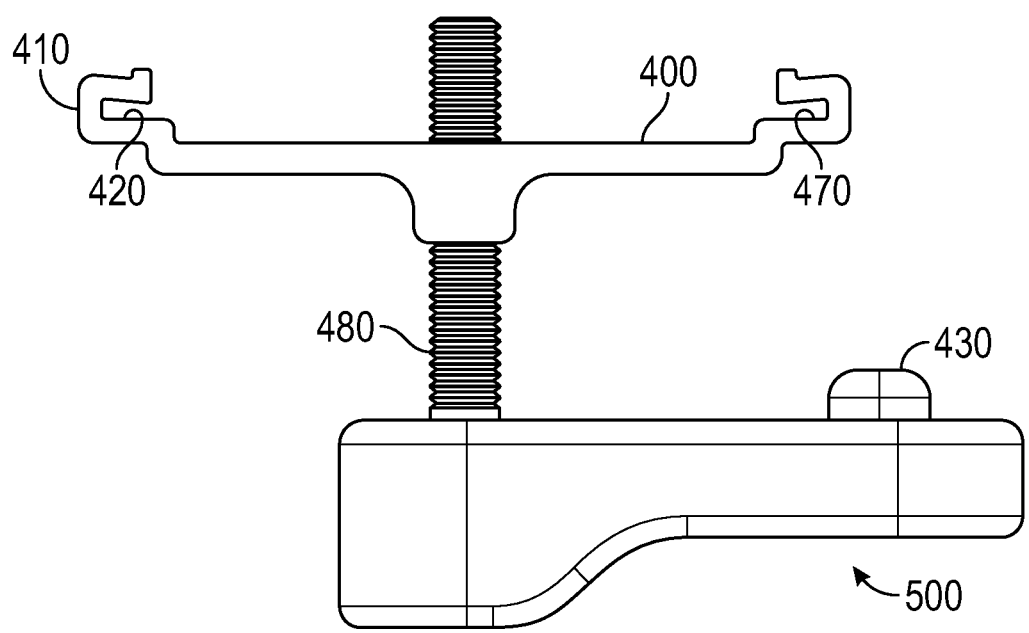
FIG. 11 illustrates a side view of the assembly shown in FIG. 5.

FIG. 7 shows the mounting plate 400 with securing apparatuses such as cam locks 340. The cam locks 340 are shown in more detail in FIGS. 8 and 9. The cam locks 340 are rotatably coupled to the base 415 of the mounting plate 400 by a bolt 390. The cam locks 340 are typically made of conducting materials, are elongated in shape, and have two sides. The first side includes a wedge 350 and an elongated or extended portion 360. The extended portion 360 also includes a raised portion 330. The raised portion 330 is used to penetrate the surface layer, which is typically an oxidation layer, of the extension plates 610 of the modules 600 so that an electrical grounding path can be provided from the modules 600 to the entire solar panel array 800. As shown in FIGS. 8 and 9, the cam locks 340 are parallel to the lips 410 and in the open position, which allows the extension plates 210 and 610 of the array skirts 200 and modules 600 respectively to be lowered and then secured. The cam locks 340 can be rotated in either a clockwise or counterclockwise direction. The wedge 350, as will be described in more detail below, is used to push the array skirt 200 or the module 600 into the inlets 420 and 470 as the cam locks 340 are rotated into a locked position meaning that the cam locks 340 are perpendicular to the lips 410. FIGS. 10 and 11 show side views of the mounting plate 400 connected to the pivot base 500. FIG. 10 shows the cam locks 340 in the open position, while FIG. 11 shows the mounting plate 400 without cam locks 340.

Figure 12:
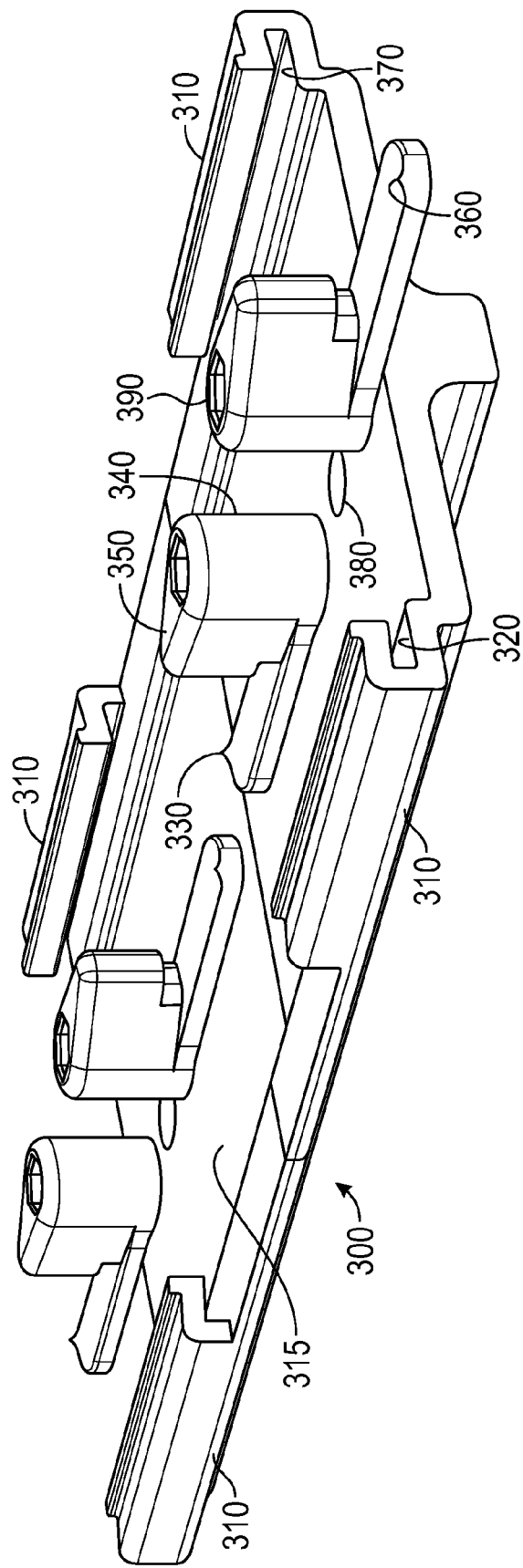
FIG. 12 illustrates a perspective view of an exemplary embodiment of a splice mount with multiple cam locks.

FIG. 12 illustrates a splice mounting plate 300. The splice 300 is used to join multiple array skirts 200 or modules 600 and typically does not require support to a flashing. The splice 300 includes many of the same elements of the mounting plate 400 and comprises a base area 380, pair of opposing lips 310 opposite sides of the splice 300, and a pair of opposing inlets 320 and 370 on a first side and a second side opposite the first side of the splice 300. Like the mounting plate 400, the inlets are used to receive the extension plates 210 and 610 of the array skirts 200 and modules 600. Similarly, a second pair of cam locks 340 are rotatably coupled to the splice 300 by way of bolt 390. The cam locks 340 include a raised portion 330 on the extended portion 360 on one side and a wedge 350 on the other. The cam locks 340 are parallel to the lips 310 and in the open position, which allows the extension plates 210 and 610 of the array skirts 200 and modules 600 respectively to be lowered and then secured. The cam locks 340 can be rotated in either a clockwise or counterclockwise direction. The wedge 350 can be of any suitable shape provided that it can serve to assist in the lateral movement of either an array skirt 200 or module 600 as it the cam lock 340 is rotated. The wedge 350 is used to laterally move the array skirt 200 or the module 600 into the inlets 320 and 370 as the cam locks 340 are rotated into a locked position meaning that the cam locks 340 are perpendicular to the lips 310. The cam locks 340 can be easily rotated by hand without the need for additional or complicated tools.

Figure 13:
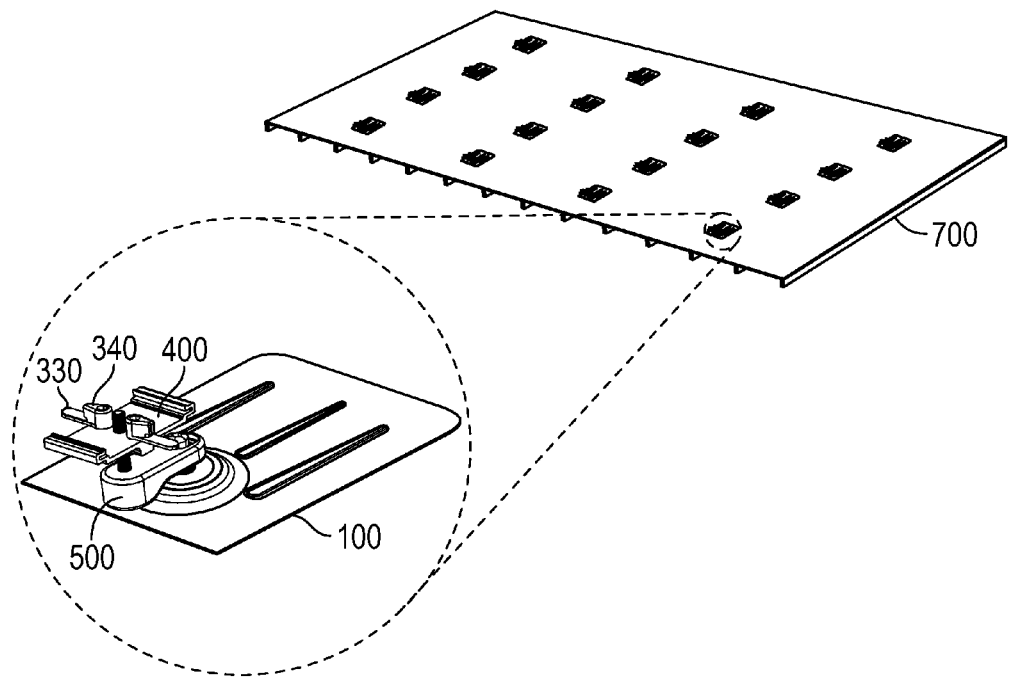
FIG. 13 illustrates the same assembly in FIG. 16 showing an exploded perspective view of a fully assembled mounting plate coupled to the flashing.
Figure 14:
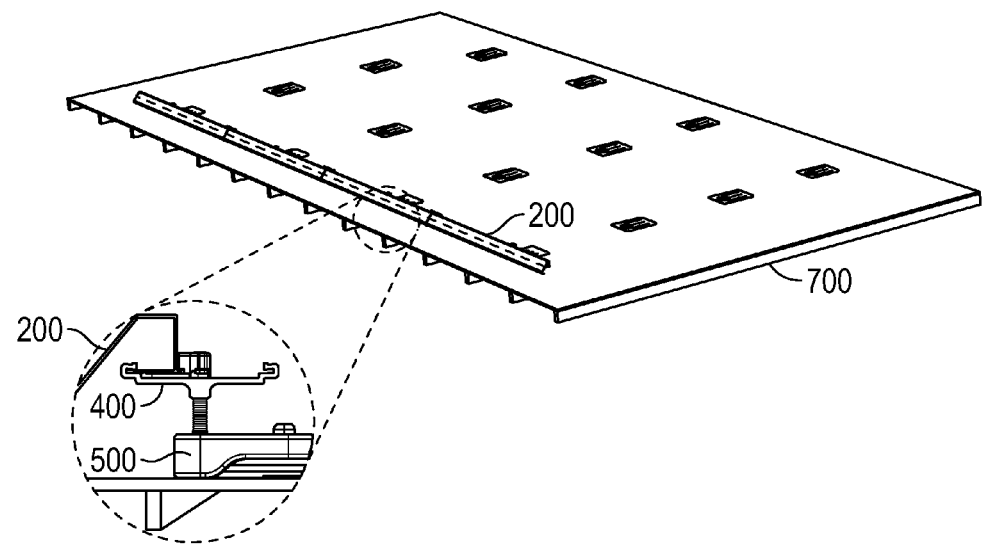
FIG. 14 illustrates the same assembly in FIG. 16 showing an exploded side view of an array skirt coupled to the mounting plate with the cam lock in the locked position.
Figure 15:
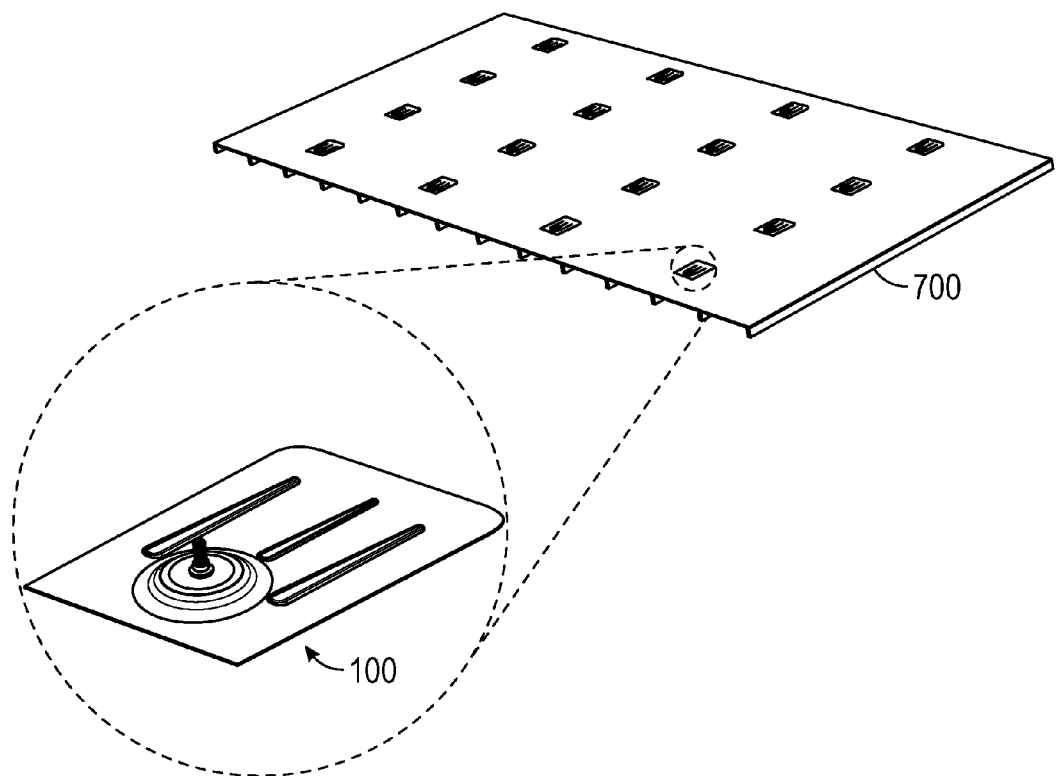
FIG. 15 illustrates a perspective view of an array of flashings on a roof and an exploded view of a single flashing.

Installation of the solar panel array 800 includes several steps as will now be described. FIGS. 13 and 14 show a typical roof 700. Generally, the first step is to install as many flashings 100 as needed to create the array 800 by securing the flashings 100 to the roof by way of the securing bolt 110 as shown in FIG. 15. As shown in the exploded view of FIG. 13, a mounting plate 400 is installed on each flashing 100. One end 430 of the pivot base 500 is rotatably coupled to the securing bolt 110 of the flashing 100. A mounting plate 400 is then installed to a pivot base 500 along bolt 480. The mounting plate 400 is rotated around the bolt 480 until the desired height of the mounting plate 400 is achieved. The exploded view in FIG. 13 shows the cam locks 340 in the open position on the mounting plate 400 and are ready to receive either the array skirts 200 or modules 600. FIG. 14 shows a fully installed row of array skirts 200 with an exploded view of a single array skirt 200 being secured to the mounting plate 400.

Figure 16:
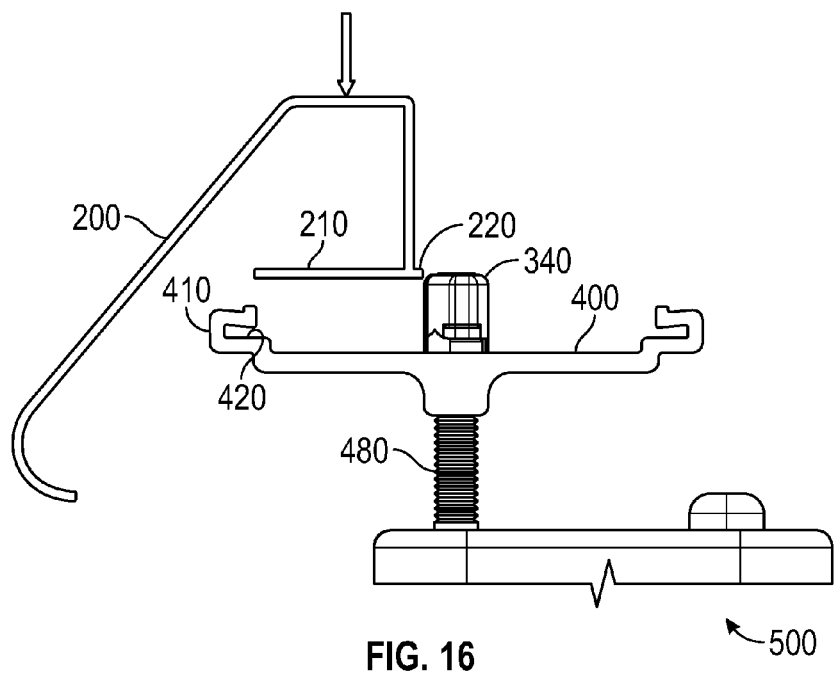
FIG. 16 illustrates a side view of an array skirt being lowered into a mounting plate.
Figure 17:
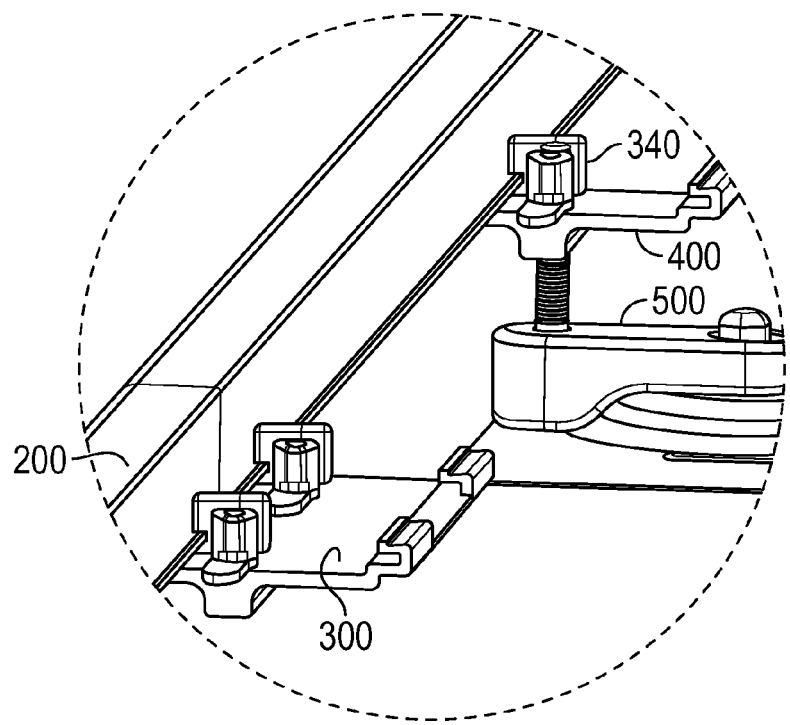
FIG. 17 illustrates a perspective view of series of array skirts secured to both a standard mounting plate and a splice.

FIGS. 16 and 17 show the first steps of installing a typical array skirt 200 to the mounting plate 400. As shown in the side view of the assembly of FIG. 16, the array skirt 200 is lowered into the mounting plate 400 while the cam locks 340 are in the open position. While in the cam locks 340 are in the open position, the array skirt 200 can be lowered into place with room to spare between the lip 410 and the cam lock 340. FIG. 17 shows a wider view of multiple array skirts 200 installed to both a mounting plate 400 and a splice 300 with the cam locks 340 in the locked position.

Figure 18:
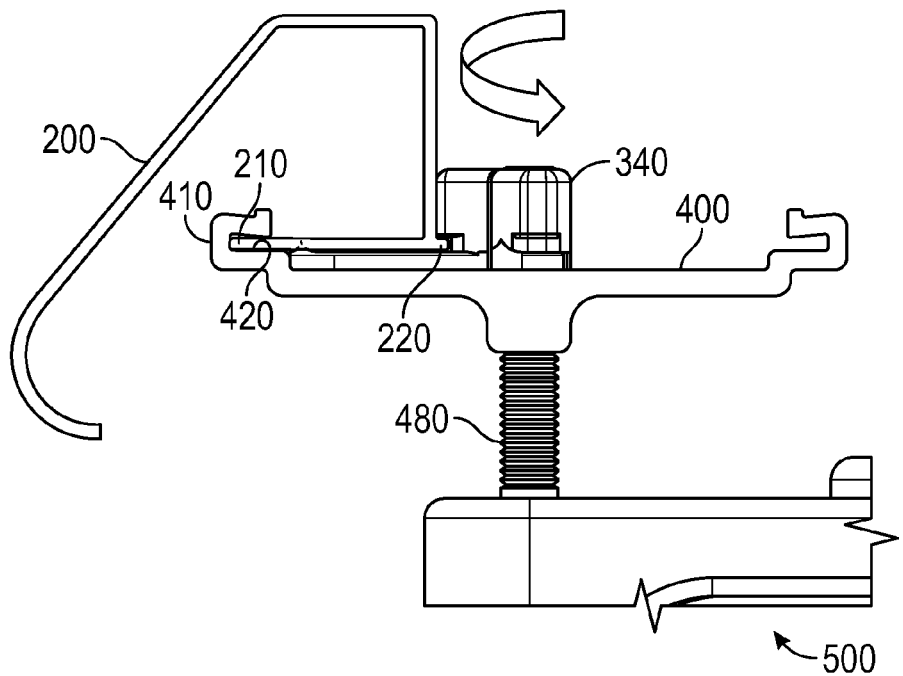
FIG. 18 illustrates a side view of a cam lock rotated from an open to a locked position and laterally moving an array skirt into place.

FIG. 18 shows the array skirt 200 being secured to the mounting plate 400. As shown, once the array skirt 200 is lowered into place, the cam lock 340 is then rotated approximately 90 degrees from the open position to the locked position. As the cam lock 340 is rotated, the wedge 350 pushes the side wall 220 of the array skirt 200 forward so that the extension plate 210 is inserted into the inlet 420 and up against the lip 410. The extended portion 360 of the cam lock 340 becomes positioned perpendicular to the lip 410 along the base of the mounting plate 400 and supports the extended portion 360. This process is repeated for each flashing 100 and where two array skirts 200 are joined together at a splice 300.

Figure 19:
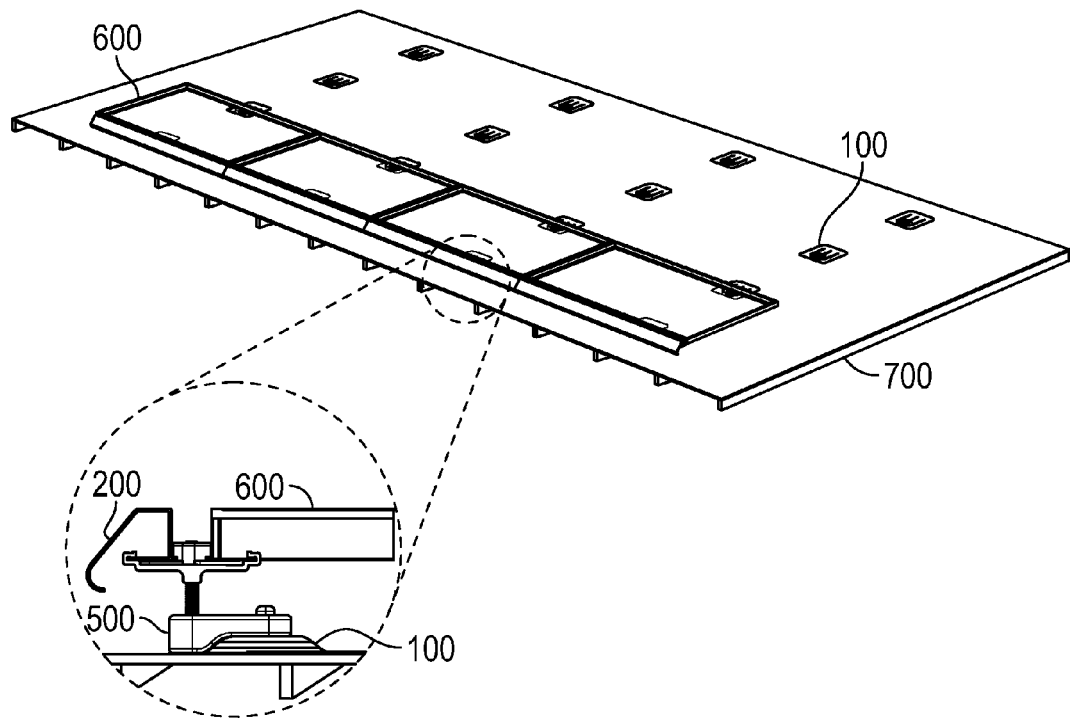
FIG. 19 illustrates a perspective view of a row of array skirts and solar panel modules fully assembled with an exploded side view of an array skirt and a solar panel secured to a mounting plate.

Once the array skirts 200 are installed to the mounting plates 400 and splices 300, FIG. 19 shows the next step, which is to install a solar panel module 600 to each mounting plate 400 and splice 300. The exploded view shows a side view of an array skirt 200 and module 600 installed on opposite sides of a mounting plate 400.

Figure 20:
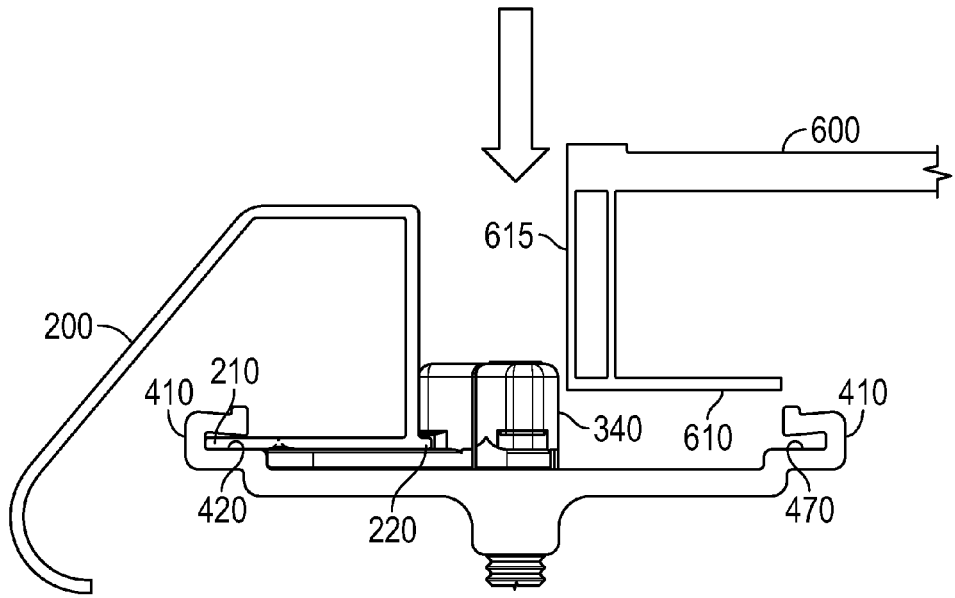
FIG. 20 illustrates a side view of an array skirt and a solar panel module being lowered onto a mounting plate with the cam locks in an open position.

FIGS. 20 and 21 show a module 600 being installed on a mounting plate 400. As shown, the mounting plate 600 is lowered on the opposite side of the array skirt 200 in the mounting plate 400. As with the array skirt 200, when the cam lock 340 is in the open position, there is room for the side wall 615 and extension plate 610 to fit in the mounting plate 400 with room to spare between the cam lock 340 and the lip 410. FIG. 21 shows the cam lock 340 being rotated approximately 90 degrees so that the wedge 350 comes in contact with the side wall 615 and pushes the module 400 laterally so that the extension plate 610 is inserted into the inlet 420 and up against the wall of the lip 410 so that the module 600 is secured to the mounting plate 400. As the cam lock 340 is rotated into the locked position, the elongated portion 360 moves beneath the extension plate 610 and the raised portion 330 penetrates an outer layer of the extension plate 610 so that it creates an electrical contact between the plate 610 and the cam lock 340. By doing so, the connection provides an electrical grounding path between the solar panel module 600 and the rest of the solar panel array 800. FIG. 22 shows a side view of a completed installation of an array skirt 200 and a module 600 to a mounting plate 400 with the cam locks 340 in the locked position. FIG. 22a shows a cross-sectional view of the raised portion 330 penetrating the outer layer of the extension plate 610 when the cam lock 340 is in the locked position.

Figure 23:
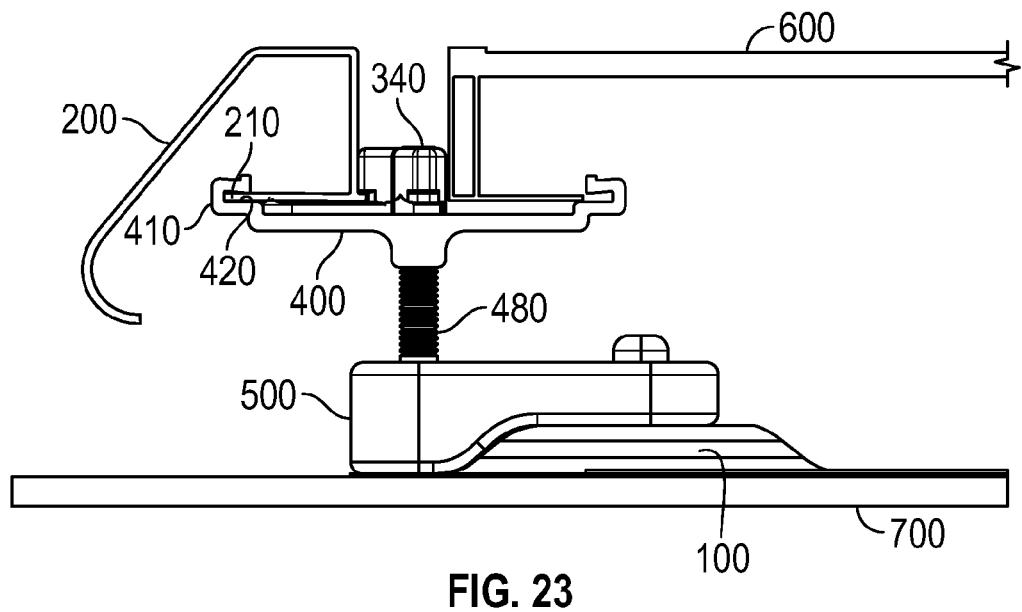
FIG. 23 illustrates a side view of a mounting plate assembled to a pivot mount with an array skirt and cam lock in the locked position and a solar panel module and cam lock in an unlocked position.
Figure 24:
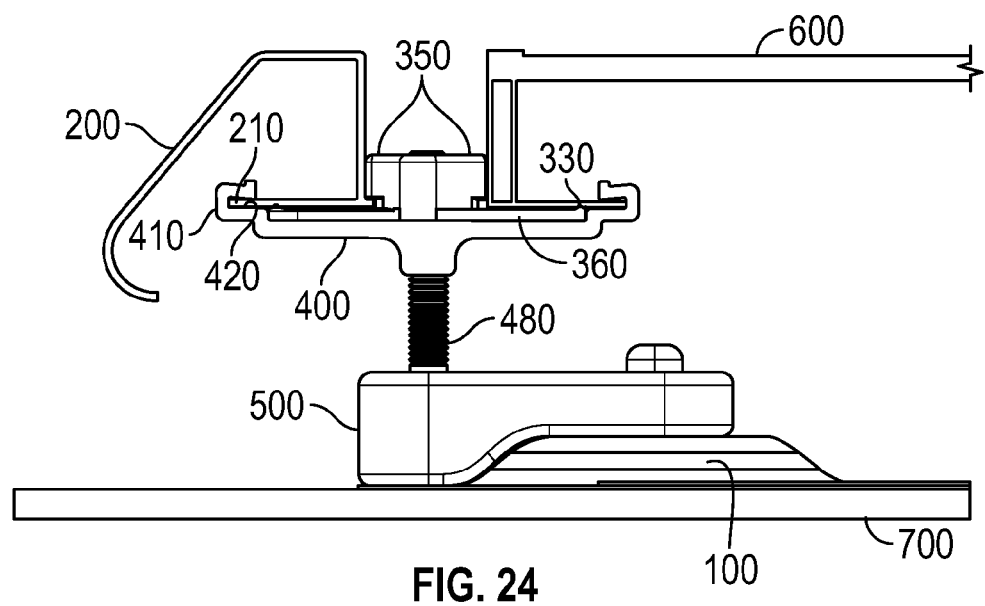
FIG. 24 illustrates a side view of the assembly in FIG. 23 with the solar panel module and the cam lock in a locked position.

FIGS. 23 and 24 show a more detailed side view of the pre and post locking of the solar panel module 600 to a mounting plate 400 that is secured to a flashing 100 in what would normally be the front row of the solar panel array 800.

Figure 25:
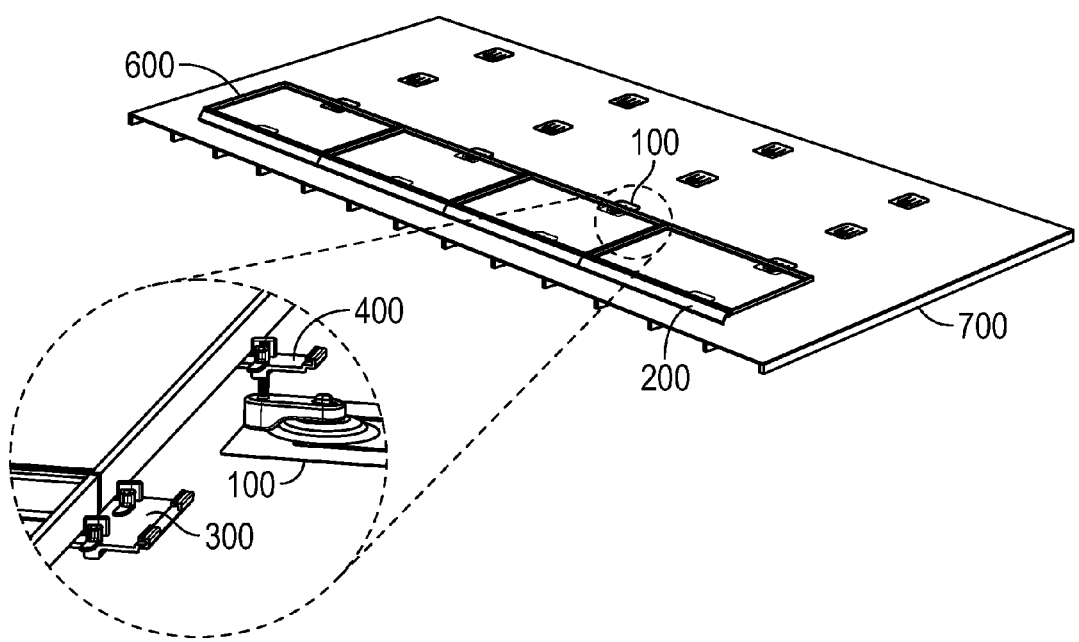
FIG. 25 illustrates the same view in FIG. 19 showing an exploded perspective view of the solar panel modules secured to a splice and a standard mounting plate.

The next step is to install the opposite side of the solar panel modules 600. FIGS. 6 and 25 show the completed step. FIG. 6 shows a side view of the opposite side of the module 600 being installed to a mounting plate 400. The illustration shows the cam lock 340 in the locked position after the module 600 was lowered into the mounting plate 400 and secured the mounting plate 400 after the cam lock 340 was rotated from the open to the locked position and providing a grounding path from the module 600 to the rest of the array 800. FIG. 25 shows a full row of the array skirts 200 and modules 600 having been installed in the first row of the array 800 and secured to both mounting plates 600 and flashings 100 as well as splices 300. After the first row is installed, each subsequent row is installed by repeating the process described above.

What is claimed is:
1. A mounting assembly for installing a solar panel array to a roof comprising:

a. a mounting plate for receiving a solar panel module; and
b. a securing apparatus rotatably coupled to the mounting plate for affixing the solar panel module to the mounting plate;
c. the mounting plate further comprising and end; and
d. the securing apparatus further comprising:
   i. a wedge; and
   ii. an elongated section beneath the wedge further comprising a raised portion for penetrating a layer on the solar panel module.

2. The mounting assembly of claim 1 wherein the end of the mounting plate is a lip.

3. The mounting assembly of claim 1 wherein the securing apparatus can be rotated from an open position to a locked position wherein the securing apparatus is substantially perpendicular to the end of the mounting plate in the locked position.

4. The mounting assembly of claim 3 such that the wedge of the elongated securing apparatus secures the solar panel module to the mounting plate by pushing the solar panel module into the end of the mounting plate as the elongated securing apparatus is rotated from the open to the locked position.

5. The mounting assembly of claim 3 such that the raised portion penetrates an oxidation layer of the solar panel module as the elongated securing apparatus is rotated from the open to the locked position.

6. The mounting assembly of claim 1 wherein the mounting plate is rotatably coupled to a pivot base.

7. The mounting assembly of claim 1 wherein the mounting plate is a splice for securing a plurality of adjacent solar panel modules by utilizing a plurality of elongated securing apparatuses.

8. A mounting assembly for installing a solar panel array to a roof comprising:
a. a mounting plate for receiving a solar panel module; and
b. a securing apparatus rotataly coupled to the mounting plate for affixing the solar panel module to the mounting plate;
c. the mounting plate further comprising
   i. a first section further comprising a first end; and
   ii. a second section comprising a second end and such that the first and second ends are opposite each other;
d. the securing apparatus further comprising:
   i. a wedge; and
   ii. an elongated section beneath the wedge further comprising a raised portion for penetrating a layer on the solar panel module.

9. The mounting assembly of claim 8 wherein the first and second ends of the mounting plate are first and second lips respectively.

10. The mounting assembly of claim 8 wherein the securing apparatus can be rotated from an open position to a locked position wherein the securing apparatus is substantially perpendicular to either the first or second end of the mounting plate.

11. The mounting assembly of claim 10 such that the wedge of the securing apparatus secures the solar panel module to the mounting plate by pushing the solar panel module into either the first or second end of the mounting plate as the securing apparatus is rotated from the open to the locked position.

12. The mounting assembly of claim 10 such that the raised portion penetrates an oxidation layer of the solar panel module as the securing apparatus is rotated from the open to the locked position.

13. The mounting assembly of claim 8 wherein the mounting plate is rotatably coupled to a pivot base.

14. The mounting assembly of claim 8 wherein the mounting plate is a splice for securing a plurality of adjacent solar panel modules by utilizing a plurality of securing apparatuses.

15. A method of securing and grounding a solar panel module to a mounting plate comprising the steps of:
a. lowering a portion of a solar panel module between an end of a mounting plate and a securing apparatus that is rotatably coupled to the mounting plate, the securing apparatus comprising a wedge and an elongated section beneath the wedge further comprising a raised portion; and
b. moving the securing apparatus from an open to a locked position such that:
   i. the wedge of the securing apparatus laterally moves the portion of the solar panel module into the end of the mounting plate; and
   ii. the raised portion penetrates a layer of the solar panel module and creates a grounding path between the solar panel module and the mounting plate.

16. The method of claim 15 wherein the end of the mounting plate is a lip.

17. The method of claim 15 wherein the step of moving the securing apparatus is accomplished by rotating the apparatus from an open position to a locked position such that the securing apparatus is substantially perpendicular to the end of the mounting plate in the locked position.

18. The method of claim 15 further comprising the step of rotating the securing apparatus so that the wedge secures the solar panel module to the mounting plate by pushing the solar panel module into the end of the mounting plate as the securing apparatus is rotated from the open to the locked position.

19. The method of claim 15 further comprising the step of having the raised portion of the securing apparatus penetrate an oxidation layer of the solar panel module as the securing apparatus is rotated from the open to the locked position.

20. The method of claim 15 wherein the mounting plate is a splice for securing a plurality of adjacent solar panel modules by utilizing a plurality of securing apparatuses.

21. The method of claim 15 further comprising the step of coupling the mounting plate to a pivot base.

22. The method of claim 21 further comprising the step of coupling the pivot base to a flashing.

23. The method of claim 22 further comprising the step of coupling the flashing to a roof.

* * * * *